US011061805B2

(12) United States Patent
Loyola et al.

(10) Patent No.: US 11,061,805 B2
(45) Date of Patent: Jul. 13, 2021

(54) CODE DEPENDENCY INFLUENCED BUG LOCALIZATION

(71) Applicant: INTERNATIONAL BUSINESS MACHINES CORPORATION, Armonk, NY (US)

(72) Inventors: Pablo Loyola, Tokyo (JP); Kugamoorthy Gajananan, Tokyo (JP); Fumiko Akiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/141,089

(22) Filed: Sep. 25, 2018

(65) Prior Publication Data

US 2020/0097387 A1    Mar. 26, 2020

(51) Int. Cl.
*G06F 11/36* (2006.01)
*G06N 20/00* (2019.01)

(52) U.S. Cl.
CPC ...... *G06F 11/3616* (2013.01); *G06F 11/3608* (2013.01); *G06F 11/3692* (2013.01); *G06N 20/00* (2019.01)

(58) Field of Classification Search
CPC ............. G06F 11/3616; G06F 11/3608; G06F 11/3692; G06N 20/00
USPC ........................................................ 717/133
See application file for complete search history.

(56) References Cited

U.S. PATENT DOCUMENTS 9,465,725 B2   10/2016   Maczuba
9,563,540 B2    2/2017   Prasad et al.
9,690,553 B1 *  6/2017   Brodie ...................... G06F 8/71
10,263,877 B1 * 4/2019   Ie ............................ G06F 16/906
2014/0149435 A1 * 5/2014 Sisman .................. G06F 11/362
                                                          707/751

(Continued)

OTHER PUBLICATIONS

Huo, Xuan, et al. "Learning Unified Features from Natural and Programming Languages for Locating Buggy Source Code," Proceedings of the Twenty-Fifth International Joint Conference on Artificial Intelligence, Jul. 2016, pp. 1606-1612.

(Continued)

*Primary Examiner* — Chat C Do
*Assistant Examiner* — Bradford F Wheaton
(74) *Attorney, Agent, or Firm* — Tutunjian & Bitetto, P.C.; Randall Bluestone

(57) ABSTRACT

A code dependency influenced bug localization apparatus and method receive bug reports and source code changes of a software program. Each source code change includes a syntax component and a location component. Each bug report includes a functional description of an aspect of the software program. The apparatus and method obtain a vectorized feature representation of each bug report, apply a learning process to the source code changes based on a code dependency among the source code changes, obtain a vectorized feature representation of each source code change based on the code dependency, merge the feature representations of the bug reports and the feature representations of the source code changes into a plurality of unified feature representations, and apply a ranking process to the unified feature representations to produce a source code relating function for relating a bug report and a source code change.

20 Claims, 10 Drawing Sheets

(56) References Cited

U.S. PATENT DOCUMENTS

| | | | | |
|---|---|---|---|---|
| 2014/0282375 | A1* | 9/2014 | Gulwani | G06F 8/36 717/107 |
| 2017/0132545 | A1 | 5/2017 | Michaely et al. | |
| 2017/0212829 | A1 | 7/2017 | Bales et al. | |
| 2018/0330268 | A1* | 11/2018 | Ben-Or | G06N 7/005 |
| 2018/0365321 | A1* | 12/2018 | Ke | G06N 3/0445 |
| 2019/0004790 | A1* | 1/2019 | Choudhary | G06F 8/751 |
| 2019/0042945 | A1* | 2/2019 | Majumdar | G06N 3/0454 |
| 2019/0227774 | A1* | 7/2019 | Banuelos | G06F 8/33 |
| 2019/0227902 | A1* | 7/2019 | Cheng | G06F 8/71 |

OTHER PUBLICATIONS

Joachims, Thorsten, "Optimizing search engines using clickthrough data," Proceedings of the eighth ACM SIGKDD international conference on Knowledge discovery and data mining, Jul. 2002, pp. 133-142.

Mikolov, Tomas, et al. "Efficient estimation of word representations in vector space," arXiv preprint arXiv, Jan. 2013, 12 pages, 1301, 3781.

Rong, Xin, "word2vec parameter learning explained," arXiv preprint arXiv, Nov. 2014, 21 pages, 1411, 2738.

Saha, Ripon K, et al. "Improving bug localization using structured information retrieval," Automated Software Engineering (ASE), 2013 IEEE/ACM 28th International Conference on, IEEE, Nov. 2013, pp. 345-355.

Ye, Xin, et al. "Mapping bug reports to relevant files: A ranking model, a fine-grained benchmark, and feature evaluation," IEEE Transactions on Software Engineering, Apr. 2016, pp. 379-402, 42, 4.

Anonymous Contribution, "Bug Localization by Learning to Rank and Represent Bug Inducing Changes," CIKM, Oct. 2018, 9 pages.

* cited by examiner

CODE DEPENDENCY INFLUENCED BUG LOCALIZATION

BACKGROUND

Technical Field

The present invention relates to bug localization. More specifically, the present invention relates to analyzing dependency of code changes for bug localization.

Description of the Related Art

Bug reports play a critical role in software engineering as they represent the primary form of communication between developers and end users. A bug report includes a portion of text, usually written in natural language, which is submitted to a bug tracker by an end user. The content of a bug report usually exposes a mismatch between the result of the execution of a component and its intended behavior.

After a bug report is submitted, a member of the development team proceeds to investigate the issues noted in the bug report, a process usually called bug localization. This task includes understand the report and then try to locate the specific portion of the program that is relevant to the reported issue, e.g., the files or modules that are more likely to contain the defect. At this time, the developer can use any auxiliary information, such as knowledge about the system or previous report history.

Bug localization can be relatively simple when the project is small, but in large scale projects, the number and complexity of both the reports and the source code files make any manual search impractical.

SUMMARY

According to an aspect of the present invention, a computer program product is provided that includes one or more computer readable storage mediums collectively storing program instructions that are executable by a computer to cause the computer to perform operations including receiving bug reports and source code changes of a software program, wherein each source code change includes a syntax component and a location component, and wherein each bug report includes a functional description of an aspect of the software program, obtaining a vectorized feature representation of each bug report, applying a learning process to the source code changes based on a code dependency among the source code changes, obtaining a vectorized feature representation of each source code change based on the code dependency, merging the feature representations of the bug reports and the feature representations of the source code changes into a plurality of unified feature representations, each unified feature representation including one of the feature representations of the bug reports and one of the feature representations of the source code changes, and applying a ranking process to the unified feature representations to produce a source code relating function for relating a bug report and a source code change.

An aspect of the present invention may also include a method performed by a processor executing the instructions of the computer program product, and an apparatus that performs the method.

These and other features and advantages will become apparent from the following detailed description of illustrative embodiments thereof, which is to be read in connection with the accompanying drawings. The summary clause does not necessarily describe all necessary features of the embodiments of the present invention. The present invention may also be a sub-combination of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the present invention.

The general goal of bug localization is to transfer a logic derived from the natural language of the bug report into the functional semantics of the source code. The bug report is treated as a query and the set of source code files that implement the system is the search pool. Therefore, the goal is to find the source code file that best matches the query.

The idea of generating unifying architectures between natural language and source code has been a challenging task for both natural language processing and software engineering research communities. The vision is that a seamless transition between both constructs could improve program understanding tasks, such as code comprehension, summarization. Such obtained knowledge could in turn help developers in more direct tasks such as debugging and repair. While recent research on the naturalness of code has shown evidence of a similarities in distributional terms between natural language and source code, there are inherent differences such as structural and stylistic properties.

While relating bug reports to source code files can be seen as a natural way to proceed, providing to the developers only the source code file associated to the bug report does not give enough context to actually fix the associated bug, because the developer will only know the location of the problem, and not the cause. Rather than working at the source code file level, working at the source code change level, e.g., identifying the code change that was responsible for introducing the bug into the system, may inform the developer not only of the location of the bug, but also the cause, which may ease the debugging task (for example, reversing a specific change).

To achieve that, embodiments of the present invention may learn feature representations of code changes from a change dependency perspective, by incorporating the inherent relationships between changes. To that end, the history of code changes can be transformed into a directed acyclic graph from which a graph embedding approach learns a feature representation for each change considering its context associated to the development activity. These feature representations can be learned alone or alongside feature representations of code changes from a syntactic perspective.

Assuming a software project is large enough, there will be a set of bug reports, extracted from a bug tracker, and a set of source code changes, extracted from a code change history.

Figure 1:
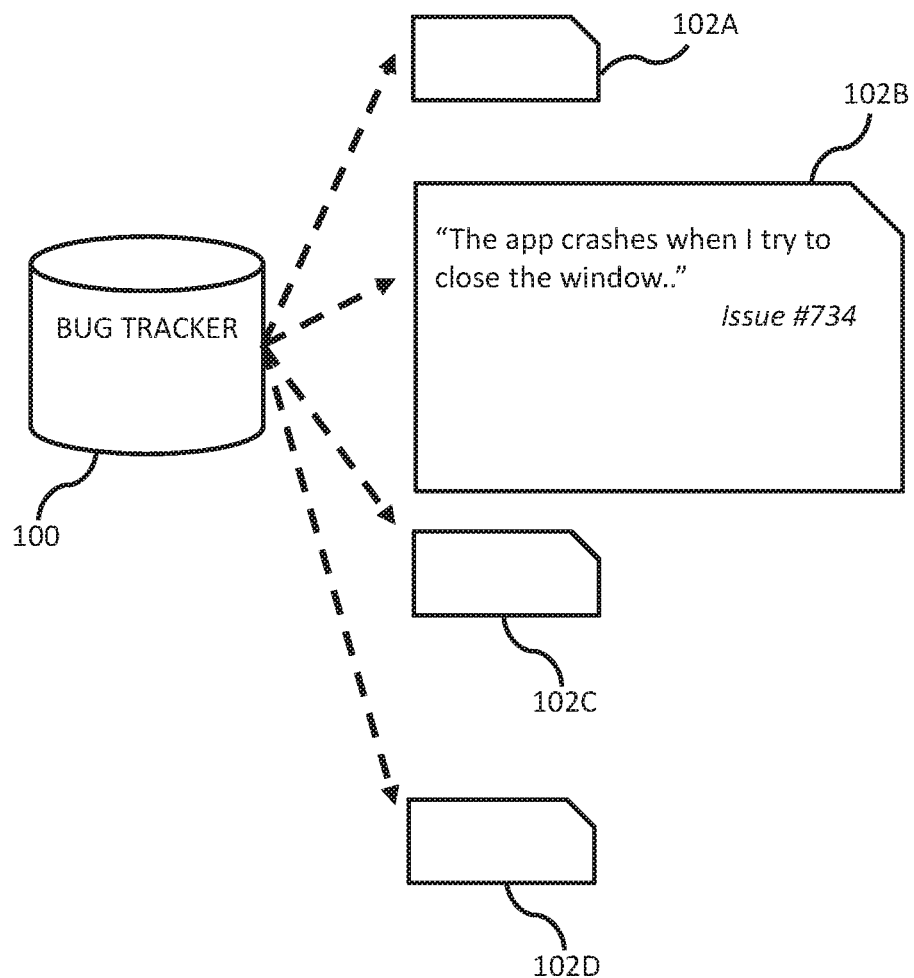
FIG. 1 shows a bug tracker, according to an embodiment of the present invention.

FIG. 1 shows a bug tracker 100, according to an embodiment of the present invention. Bug tracker 100 includes an ordered history of bug reports, which includes bug reports 102A-D. As explained above, a bug report includes a portion of text, usually written in natural language, that exposes a mismatch between the result of the execution of a component and its intended behavior. In bug report 102B, the portion of text recites "The app crashes when I try to close the window . . . " Bug report 102B appears to have been assigned a code related to the issue, which is "Issue #734." Such additional information may not always be included in bug reports, but can help establish the relationship between a bug report and the source code change that caused it.

In the foregoing embodiment, the bug tracker includes bug reports that include a fault. In other embodiments, the bug tracker may include feature request reports, and any other portion of text that includes a functional description of a component of the software program. For purposes of this disclosure, the term "bug report" shall include any reports including such functional descriptions.

Figure 2:
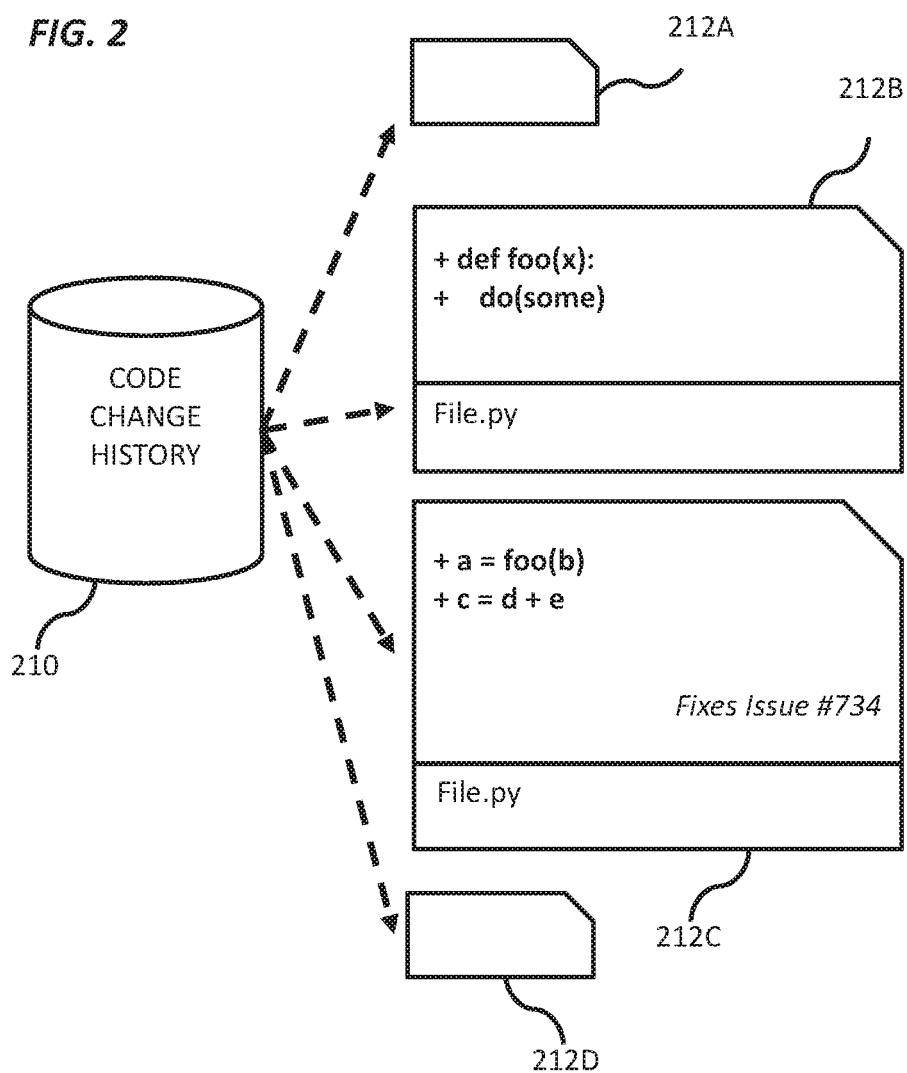
FIG. 2 shows a code change history, according to an embodiment of the present invention.

FIG. 2 shows a code change history 210, according to an embodiment of the present invention. Code change history 210 includes an ordered history of source code changes, which includes code changes 212A-D. A code change includes the syntax added and/or removed from the source code, and a location of the addition and/or removal. In code change 212B, the syntax "def foo(x):" and "do(some)" has been added, and nothing has been removed. The location of the additional syntax in code change 212C is "File.py." Code change 212C appears to have a notation indicating that the code change fixes a bug. The notation "Fixes Issue #734" corresponds with bug report 102B in FIG. 1. Such additional information may not always be included in code changes, but can help establish the relationship between a bug report and the source code change that caused it.

In the foregoing embodiment, the code change history shows a location of a file, "File.py," which indicates a granularity of evaluation at the file level. In other words, bugs are located at the file level, meaning that the bug locator will ultimately return the identification of a file related to a bug report, but may not provide the function(s) or line(s) within the file. In other embodiments, the granularity of the bug location may be performed at the function level, line level, etc. For particularly large software programs, the granularity may be larger than the file level, such as at the folder level. Also, in the foregoing embodiment, each source code change is associated with one location. In this and other embodiments, each source code change may be associated with one or more locations, depending on the size of the source code change. In this and other embodiments, a code change history may or may not include the first edition of the source code. In other words, the code change history may include a "code change 0," meaning the initial code change changed the source code from nothing to the first version of the source code.

Figure 3:
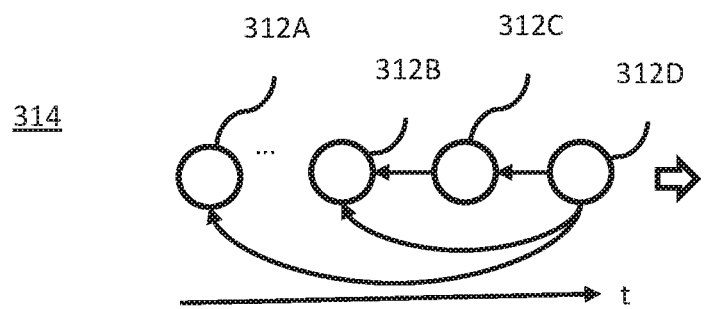
FIG. 3 shows a code dependency graph, according to an embodiment of the present invention.

FIG. 3 shows a code dependency graph 314, according to an embodiment of the present invention. Code dependency graph 314 shows nodes that represent code changes, including nodes 312A-D, and edges representing dependencies between them. Code dependency graph 314 shows temporal dependencies at different levels of granularity of the software development process in the past using a concept of code change genealogy. For example, there are edges that connect node 312D to each of nodes 312A, 312B, and 312C, meaning that the code change represented by node 312D impacted the code changes represented by nodes 312A, 312B, and 312C. There is also an edge connecting node 312C to node 312B, meaning that the code change represented by node 312C impacted the code change represented by node 312B. If the code change represented by node 312C corresponds to code change 212C in FIG. 2, which includes the notation that the code change fixed the issue of bug report 102B in FIG. 1, then one may conclude that bug report 102B was introduced by a fault caused by the code change represented by node 312B, which corresponds to code change 212B in FIG. 2, for example. Therefore, bug report 102B and code change 212B can be used as a report-change pair for purposes of feature learning and ranking. However, as will be described, finding report-change pairs is not the only use for code dependency graphs. Embodiments of the present invention that include the original version of the source code may have more complete code dependency graphs, because each source code change will be able to connect to the original version of the source code, if nothing else.

A training set can be extracted by reviewing the history of resolved issues, and obtaining more report-change pairs. Once trained, embodiments of the present invention may estimate, given a new bug report, which source code changes are more likely responsible for introducing the related fault, and obtain the file(s) associated with the source code change.

Training may include processing each feasible report-change pair through a feature learning process to output a unified vectorized feature representation, which is then passed to a ranking process, which estimates a relevance score for the pair. For example, pairing a bug report with a code change that was made after the date of the bug report would not be feasible. During each training step, the errors produced by the ranking process are backpropagated to the feature learning process, adapting the feature learning process towards more expressive feature representations.

Figure 4:
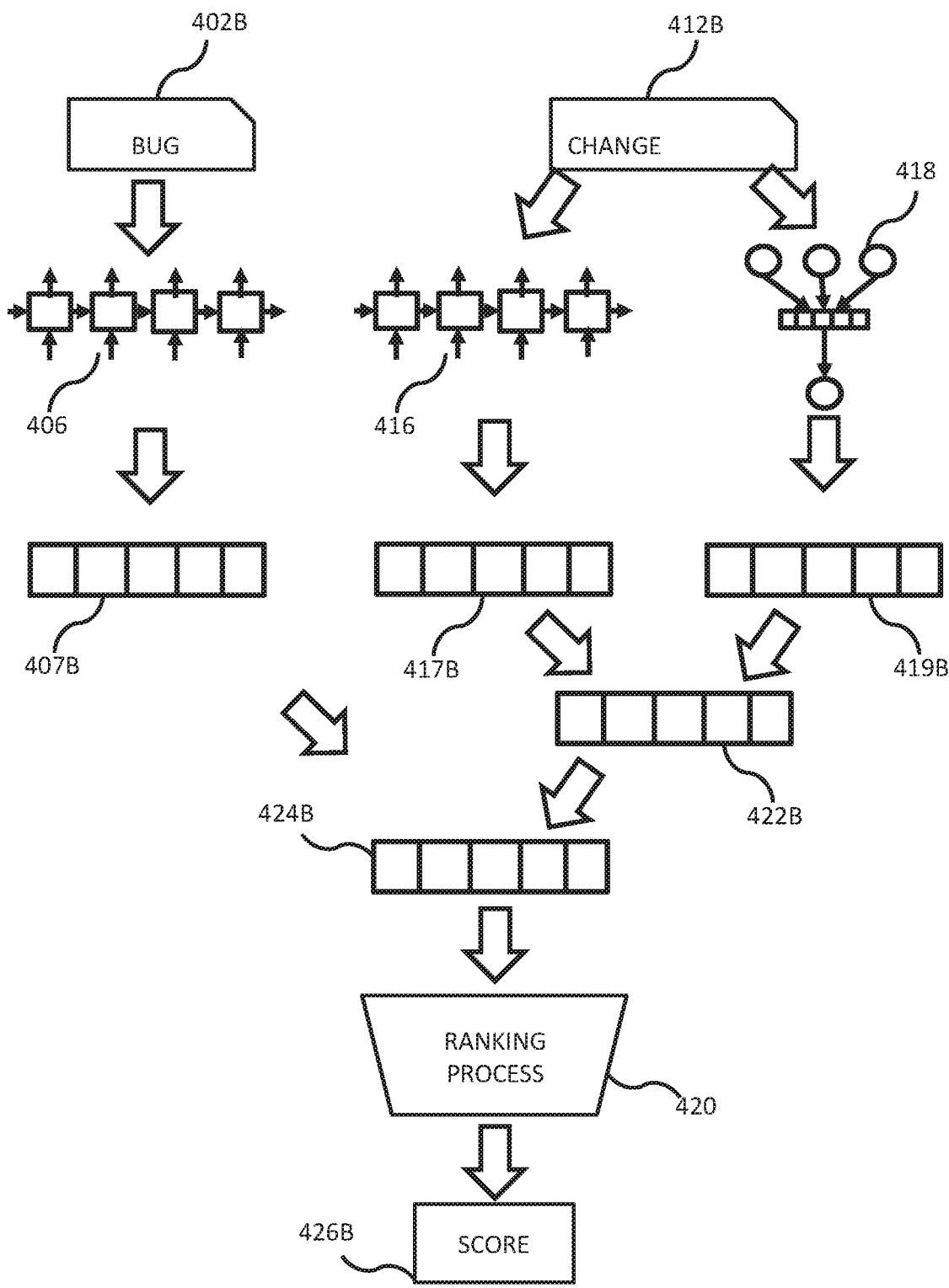
FIG. 4 shows a diagram of the interaction of feature learning and ranking in code dependency influenced bug localization, according to an embodiment of the present invention.

FIG. 4 shows a diagram of the interaction of feature learning and ranking in code dependency influenced bug localization, according to an embodiment of the present invention. The diagram shows the processing of a report-change pair including bug report 402B and code change 412B, which correspond to bug report 102B of FIG. 1 and code change 212B of FIG. 2. Bug report 402B undergoes a feature learning process 406, the output of which is feature representation 407B, which is a vectorized feature representation of bug report 402B. Code change 412B undergoes a syntactic feature learning process 416, the output of which is feature representation 417B, which is a vectorized feature representation of code change 412B based on syntax, in parallel with a dependency feature learning process 418, the output of which is feature representation 419B, which is a vectorized feature representation of code change 412B based on code dependency. Feature representation 417B is combined with feature representation 419B to form feature representation 422B, which is a vectorized feature representation of code change 412B based on both syntax and code dependency. Feature representation 407B is combined with feature representation 422B to form unified feature representation 424B, which is a vectorized feature representation of the report-change pair including bug report 402 and code change 412B. Unified feature representation 424B undergoes a ranking process 420, the output of which is score 426B, which is a value representing the likelihood that code change 412B is responsible for the fault described in bug report 402B. Since code change 412B is already recognized as being responsible for the fault described in bug report 402B, the ranking process is trained to output a higher value for score 426B. In other words, the errors produced by ranking process 420 are backpropagated, and the parameters of ranking process 420 are adjusted accordingly. The errors produced by ranking process 420 are also backpropagated through feature learning processes 406, 416, and 418.

In feature learning process 406, bug report 402B is tokenized to obtain a fine grained sequence to model. The resulting sequence is passed through a token representation layer, which associates each token in the sequence with a vector representation. In some embodiments, this representation is based on both the use of pre-trained word embeddings through a lookup table for natural language tokens, and the learning of character level embeddings by splitting each token into its character components before passing through a Long Short Term Memory (LSTM) network, from which the last hidden state is captured. Character-level feature extraction may be more helpful than the lookup table in the case of low frequency words. For tokens that are not identified as part of natural language or that do not appear in the lookup table, a random initialization may be defined.

The resulting representation of each token may then be the concatenation of the token and character level representations. A bidirectional LSTM may then read the sequence of resulting representations of each token, and return a hidden state at each step. More formally, given a sequence S= $\{t_1, \ldots, t_N\}$, let h be the aggregation of all the word representations for the entire sequence S, and $h_i$ be the word representation associated with the embedded token $t_i$, defined by the concatenation $h_i = [\overrightarrow{h_i}, \overleftarrow{h_i}]$, where $\overrightarrow{h_i}$=LSTM($t_i$, $\overrightarrow{h_{i-1}}$) and $\overleftarrow{h_i}$=LSTM($t_i$, $\overleftarrow{h_{i-1}}$) are the forward and backward passes of the bidirectional LSTM, respectively. As each sequence is of different size, the resulting representations might vary in size. Therefore, a pooling layer may be implemented to force a fixed length. Additionally, in order to allow feature learning process 406 to learn the specific parts of the sequences that have more expressive power during classification, a global attention mechanism may be implemented, such as:

$$u_i = v^\top \tanh(W[\bar{h}; h_i]) \quad \text{Eq. (1)}$$

$$\alpha_i = \frac{\exp u_i}{\sum_{k=1}^{n} \exp u_k} \quad \text{Eq. (2)}$$

$$\vec{r}' = \sum_{i=1}^{n} \alpha_i h_i \quad \text{Eq. (3)}$$

where both v and W are trainable parameters, $u_i$ encodes the importance of word i with respect to all the words in the sequence S, $\alpha_i$ is a weighting, $\Sigma_{i=1}^{n} \exp u_k$ represents the sum of the exponential of all u and r' is feature representation 407B, which is a refined sentence representation from the bug report.

Although bug report 402B uses natural language, some bug reports contain portions of source code, such as cases where the end user adds source code to show a specific feature or log associated with the fault. In order to account for the presence of both source code and natural language, some embodiments of feature learning process 406 may distinguish between the source code and the natural language, and tokenize accordingly.

In feature learning process 416, code change 412B is tokenized, and processed into feature representation 417B. Code change 412B is the output of applying the duff command between two consecutive versions of a program, which contains both the lines that were added and the ones that were removed. Although there are several ways to combine both, for example, selecting only the tokens that are not repeated between them, code change 412B is just a concatenation of the added and removed lines. In some embodiments, a bilinear LSTM module receives the sequence of tokens whose vector representations are initialized randomly. The last hidden state is captured and treated as feature representation 417B, which is a vectorized feature representation of code change 412B based on syntax.

In feature learning process 418, a code dependency graph, such as code dependency graph 314 in FIG. 3, is used to increase the degree of expressiveness by encoding the temporal dependency of code change 412B. In some embodiments, random walks of a given length are computed from each node of a code dependency graph, and may be used as sequences to train a neural embedding model, trying to maximize the probability of the code changes appearing in the context (e.g., neighborhood) given defined code changes $c_i$, $c_j$, $c_k$ and weight $w_k$. Although random walks are computed for all of the source code changes, training may be performed using only source code changes that correspond to bug reports in report-change pairs. In such embodiments, a word embedding model may be utilized, in which the probability to be maximized is:

$$P(c_j | c_i) = \frac{\exp(c_j^\top c_i)}{\sum_{w_k \in |V|} \exp(c_k^\top c_i)} \quad \text{Eq. (4)}$$

Therefore, in each epoch, the negative log likelihood of the elements surrounding ($SU_{c_i}$) a given element $c_i$ is minimized:

$$J = \sum_{c_i \in t} \sum_{c_j \in SU_{c_i}} -\log P(c_j | c_i) \quad \text{Eq. (5)}$$

The model parameters may be optimized through gradient descent where the corresponding derivatives are computed using back-propagation and the specific values for a are obtained through a small validation set. The output is feature representation 419B, which is a vectorized feature representation of code change 412B based on code dependency.

Once feature representation 417B and feature representation 419B are obtained, they are combined, such as through concatenation, to form feature representation 422B, which is a vectorized feature representation of code change 412B based on both syntax and code dependency. Feature representation 422B is then combined with feature representation 407B to form unified feature representation 424B, which is a vectorized feature representation of the report-change pair including bug report 402 and code change 412B. In forming unified feature representation 424B from feature representation 407B and feature representation 422B, although concatenation can be used, in some embodiments an aggregation layer including a concatenation of feature representation 422B ($\bar{c}'$), feature representation 407B ($\bar{r}'$), and also the result of two arithmetic operations:

$$h_{mul} = \bar{r}' \odot \bar{c}' \quad \text{Eq. (6)}$$

$$h_{dif} = |\bar{r}' - \bar{c}'| \quad \text{Eq. (7)}$$

$$u_{r,c} = [\bar{r}'; \bar{c}'; h_{mul}; h_{dif}] \quad \text{Eq. (8)}$$

Where $u_{r,c}$ is unified feature representation 424B.

Ranking process 420 is a process in which the task of ranking can be explicitly related to the task of feature learning. In some embodiments, a gradient-based learn-to-rank approach is utilized, such as RANKNET. For example, for a given report r and any pair of changes i, j which have associated learned feature vectors $u_{r,c_i}$, $u_{r,c_j}$, a score function f that returns scores $s_i = f(u_{r,c_i})$ and $s_j = f(u_{r,c_j})$ is learned. Assuming that i should be ranked higher than j, such probability $P_{ij}$ can be modeled as:

$$P_{ij} = \frac{1}{1 + e^{-\sigma(s_i - s_j)}} \quad \text{Eq. (9)}$$

The cost to be minimized is the associated cross entropy:

$$C = -\bar{P}_{ij} \log P_{ij} - (1 - \bar{P}_{ij}) \log(1 - P_{ij}) \quad \text{Eq. (10)}$$

Where $\bar{P}_{ij}$ represents the ground truth probability. Note that assuming a set of discrete relevance labels $S_{ij} \in \{0, \pm 1\}$, $\bar{P}_{ij}$ can be expressed as $\bar{P}_{ij} = \frac{1}{2}(1 + S_{ij})$. Re-writing the cross entropy in terms of $P_{ij}$ and $\bar{P}_{ij}$, we obtain:

$$C = \frac{1}{2}(1 - S_{ij})\sigma(s_i - s_j) + \log(1 + e^{-\sigma(s_i - s_j)}) \quad \text{Eq. (11)}$$

Then, assuming a model with a learnable module W, which may be parametrized with a standard feed forward neural network, the weights $w_k$ are iteratively updated in an effort to minimize the cost C via stochastic gradient descent with an estimated learning rate η:

$$w_k = w_k - \eta \frac{\partial C}{\partial w_k} \quad \text{Eq. (12)}$$

Because ranking process 420 and feature learning processes 406, 416, and 418 are explicitly connected, the errors from ranking process 420 are backpropagated to feature learning processes 406, 416, and 418. With this explicit connection, the backpropagation process guides the learned representations to be more expressive towards the ranking, facilitating end-to-end training.

In empirical studies, a particular embodiment of the invention was compared with standard bug localization methods that do not utilize code change dependency. Following standard studies on bug localization, the Mean Average Precision (MAP), which given a query, takes the relevant answers associated to the ranking and computes the average scores, the Mean Reciprocal Rank (MRR), which is the average of the reciprocal ranks of results of a set of queries, and the Top-N Rank, which is the number of bugs whose associated changes are ranked in the top N (N=1, 5) of the returned results were used. In these studies, the particular embodiment outperformed the standard methods in all metrics. Of the standard methods, only the tree-based approach (TBCNN) seemed to be comparable, but the time required for such an approach is around 60% higher due to the increased computational resource requirement.

In an embodiment of the invention, the bug report feature learning process may use the pre-trained 300-dimensional GloVe (Global vectors for word representation) vectors. Each character embedding may be initialized as a 20-dimensional vector and the character-level LSTM output dimension was set to 50. The word-level LSTM output dimension may be set to 300, which means that after concatenating word-level and character-level representations, the result is 350-dimensional word vectors for each direction (e.g., $h_i \in R^{700}$). For the global attention mechanism the parameter W is defined as a square matrix matching the dimension of the concatenated vector $[\bar{h}; h_i]$ (e.g., $W \in R^{1400 \times 1400}$) and v is defined as a vector matching the same dimension (e.g., $v \in R^{1400}$). Both W and v may be initialized by randomly sampling from the uniform distribution on the interval (−0.005, 0.005). For the code change feature learning, the recurrent model may be configured with a 300 dimensional output. The feature learning from the dependency graph may consider the setting of the length of the random walk, which varies for each project, but on average may be set as 60, and the context window, which may be set as 10. RMSProp may be used as an optimizer for all the recurrent models in the architecture.

In the foregoing embodiment, the length of the random walk may be set as 60 on average. However, the length of the random walk may be more sensitive than other parameters, and thus will vary more among embodiments of the invention. Increasing the random walk length may improve results, but at the expense of increased computational resources.

When comparing the foregoing particular embodiment to itself, but without the dependency feature representation learning process, performance was decreased in all metrics. When comparing the foregoing particular embodiment to itself, but without backpropagating errors of the ranking process to the feature representation learning processes, performance was also decreased in all metrics.

Figure 5:
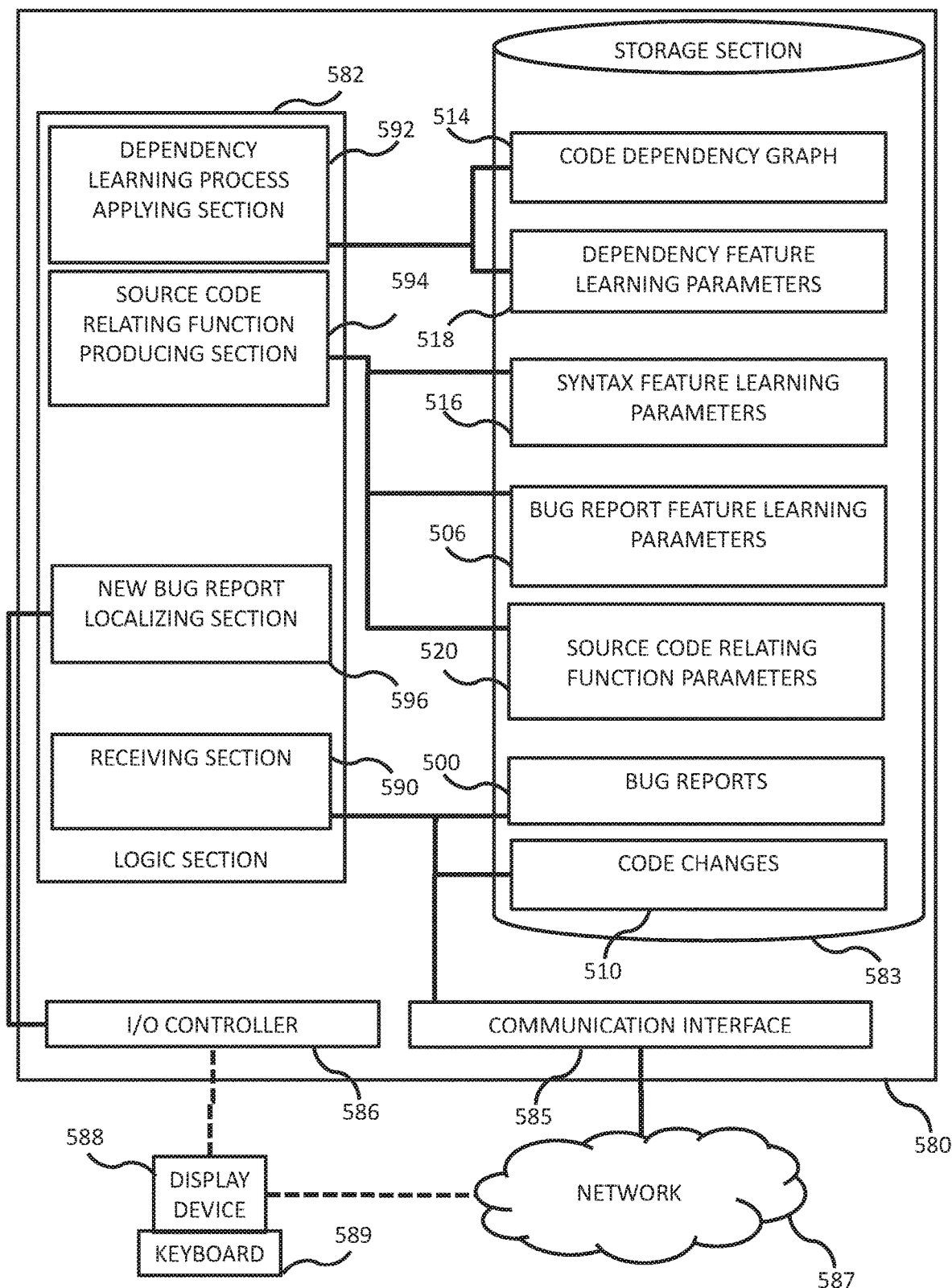
FIG. 5 shows an exemplary hardware configuration for code dependency influenced bug localization, according to an embodiment of the present invention.

FIG. 5 shows an exemplary hardware configuration for code dependency influenced bug localization, according to an embodiment of the present invention. The exemplary hardware configuration includes apparatus 580, which communicates with network 587, and interacts with a user through display device 588 and keyboard 589. Apparatus 580 may be a host computer such as a server computer or a mainframe computer that executes an on-premise application and hosts client computers that use it, in which case apparatus 580 may not be connected to display device 588 and keyboard 589 directly, but may be connected through a terminal device through network 587. Apparatus 580 may be a computer system that includes two or more computers. Apparatus 580 may be a personal computer that executes an application for a user of apparatus 580.

Apparatus 580 includes a logic section 582, a storage section 583, a communication interface 585, and an input/output controller 586. Logic section 582 may be a computer program product including one or more computer readable storage mediums collectively storing program instructions that are executable by a processor or programmable circuitry to cause the processor or programmable circuitry to perform the operations of the various sections. Logic section 582 may alternatively be analog or digital programmable circuitry, or any combination thereof. Logic section 582 may be composed of physically separated storage or circuitry that interacts through a communication bus. Storage section 583 may be a non-volatile computer-readable medium capable of storing non-executable data for access by logic section 582 during performance of the processes herein. Communication interface 585 reads transmission data, which may be stored on a transmission buffering region provided in a recording medium, such as storage section 583, and transmits the read transmission data to network 587 or writes reception data received from network 587 to a reception buffering region provided on the recording medium. Input/output controller 586 connects to various input and output units, such as display device 588 and keyboard 589, via a parallel port, a serial port, a keyboard port, a mouse port, a monitor port, and the like to accept commands and present information.

Logic section 582 includes receiving section 590, dependency relating function producing section 592, source code relating function producing section 594, and new bug report localizing section 596. Storage section 583 includes bug reports 500, code changes 510, bug report feature learning parameters 506, dependency feature learning parameters 518, syntax feature learning parameters 516, code dependency graph 514, and source code relating function 520.

Receiving section 590 is the portion of logic section 582 that receives data from storage section 583 and network 587, in the course of code dependency influenced bug localization. Receiving section 590 may include sub-sections for performing additional functions, as described in the flow charts below. Such sub-sections may be referred to by a name associated with their function.

Dependency learning process applying section 592 is the portion of logic section 582 that applies a dependency learning process, in the course of code dependency influenced bug localization. Dependency learning process applying section 592 processes code dependency graph 514 to learn feature representations of code changes based on dependency, using dependency feature learning parameters 518, which is the portion of storage section 583 that stores parameters of the dependency feature learning process. Dependency learning process applying section 592 may include sub-sections for performing additional functions, as described in the flow charts below. Such sub-sections may be referred to by a name associated with their function.

Source code relating function producing section 594 is the portion of logic section 582 that produces source code relating function 520, in the course of code dependency influenced bug localization. Source code relating function producing section 594 processes the unified feature representations using source code relating function parameters 520, which is the portion of storage section 583 that stores parameters of the source code relating function. Source code relating function producing section 594 may include sub-sections for performing additional functions, as described in the flow charts below. Such sub-sections may be referred to by a name associated with their function.

New bug report localizing section 596 is the portion of logic section 582 that localizes new bug reports, in the course of code dependency influenced bug localization. New bug report localizing section 596 applies the source code relating function to a new bug report to determine the location of the source code that relates to the new bug report. New bug report localizing section 596 may include sub-sections for performing additional functions, as described in the flow charts below. Such sub-sections may be referred to by a name associated with their function.

In other embodiments, the apparatus may be any other device capable of processing logical functions in order to perform the processes herein. The display device may be any other device capable of output of information that can be understood by those having skill in the art. The keyboard may be any other device capable of inputting commands to the apparatus, such as commanding the apparatus to perform code dependency influenced bug localization. The apparatus may not need to be connected to a network in environments where the input, output, and all information is directly connected. The logic section and the storage section need not be entirely separate devices, but may share one or more computer-readable mediums. For example, the storage section may be a hard drive storing both the computer-executable instructions and the data accessed by the logic section, and the logic section may be a combination of a central processing unit (CPU) and random access memory (RAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Figure 6:
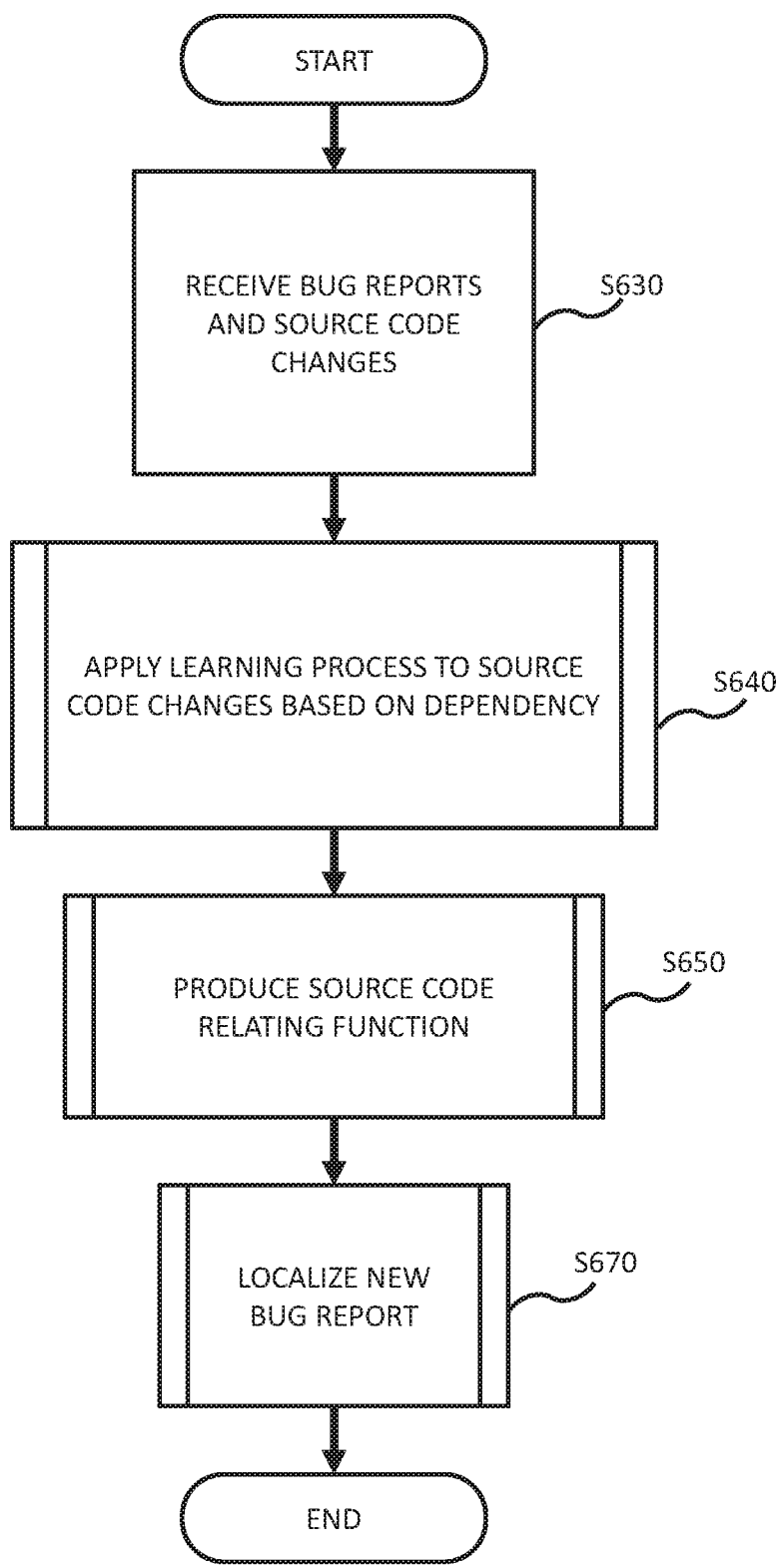
FIG. 6 shows an operational flow for code dependency influenced bug localization, according to an embodiment of the present invention.

FIG. 6 shows an operational flow for code dependency influenced bug localization, according to an embodiment of the present invention. The operational flow may provide a method of code dependency influenced bug localization.

At S630, a receiving section, such as receiving section 590, receives bug reports and source code changes of a software program, wherein each source code change includes a syntax component and a location component, and wherein each bug report includes a functional description of an aspect of the software program. The location component may include one or more locations.

At S640, a dependency learning process applying section, such as dependency learning process applying section 592, applies a learning process to the source code changes based on a code dependency among the source code changes. In some embodiments, applying the learning process includes applying a weighted learning process. For example, the learning process may apply weights to the input locations that are proportional to the relative frequency the location appears in the same random walk as the target source code change.

At S650, a source code relating function producing section, such as source code relating function producing section 594, produces a source code relating function for relating a bug report and a source code change by processing the bug reports and source code changes of the software program.

At S670, a new bug report localizing section, such as new bug report localizing section 596, localizes a new bug report using the source code relating function. A new bug report may not have been included in the bug reports received at S630 and processed to produce the source code relating function.

Figure 7:
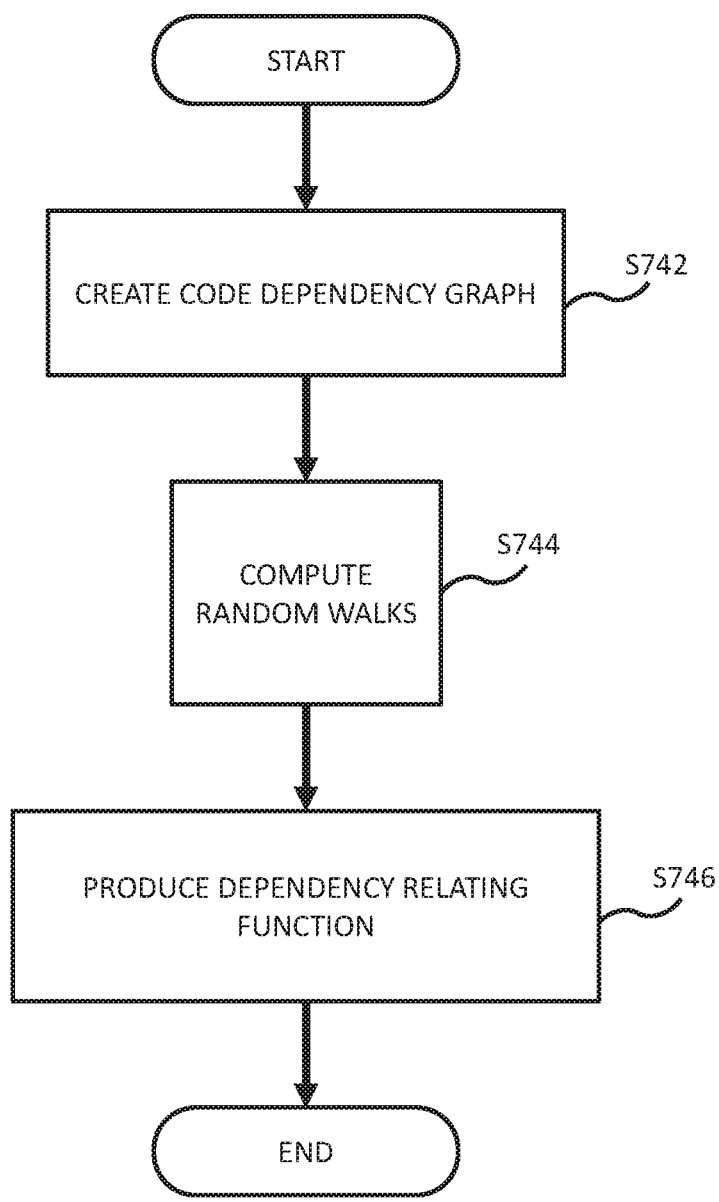
FIG. 7 shows an operational flow for applying a learning process to source code changes based on dependency, according to an embodiment of the present invention.

FIG. 7 shows an operational flow for applying a learning process to source code changes based on dependency, such as S640 in FIG. 6, according to an embodiment of the present invention. The operations within this operational flow may be performed by a dependency learning process applying section, such as dependency learning process applying section 592, or a correspondingly named sub-section thereof.

At S742, a code dependency creating section, such as dependency learning process applying section 592 or a sub-section thereof, creates a code dependency graph of source code changes. Such a code dependency graph may be of the type wherein each source code change is represented by a node, and for each node, an edge is drawn from the node to the nearest previous node representing a source code change including the same location, for each location in the location component included in the node.

At S744, a random walk computing section, such as dependency learning process applying section 592 or a sub-section thereof, computes a plurality of random walks starting from each node, each random walk being a string of nodes connected by edges over a distance of nodes.

At S746, a random walk computing section, such as dependency learning process applying section 592 or a sub-section thereof, produces a dependency relating function for determining the probability that a source code change is related to one or more other source code changes from the plurality of random walks. The dependency relating function may form the basis for a dependency feature learning process, such as dependency feature learning process 418.

Figure 8:
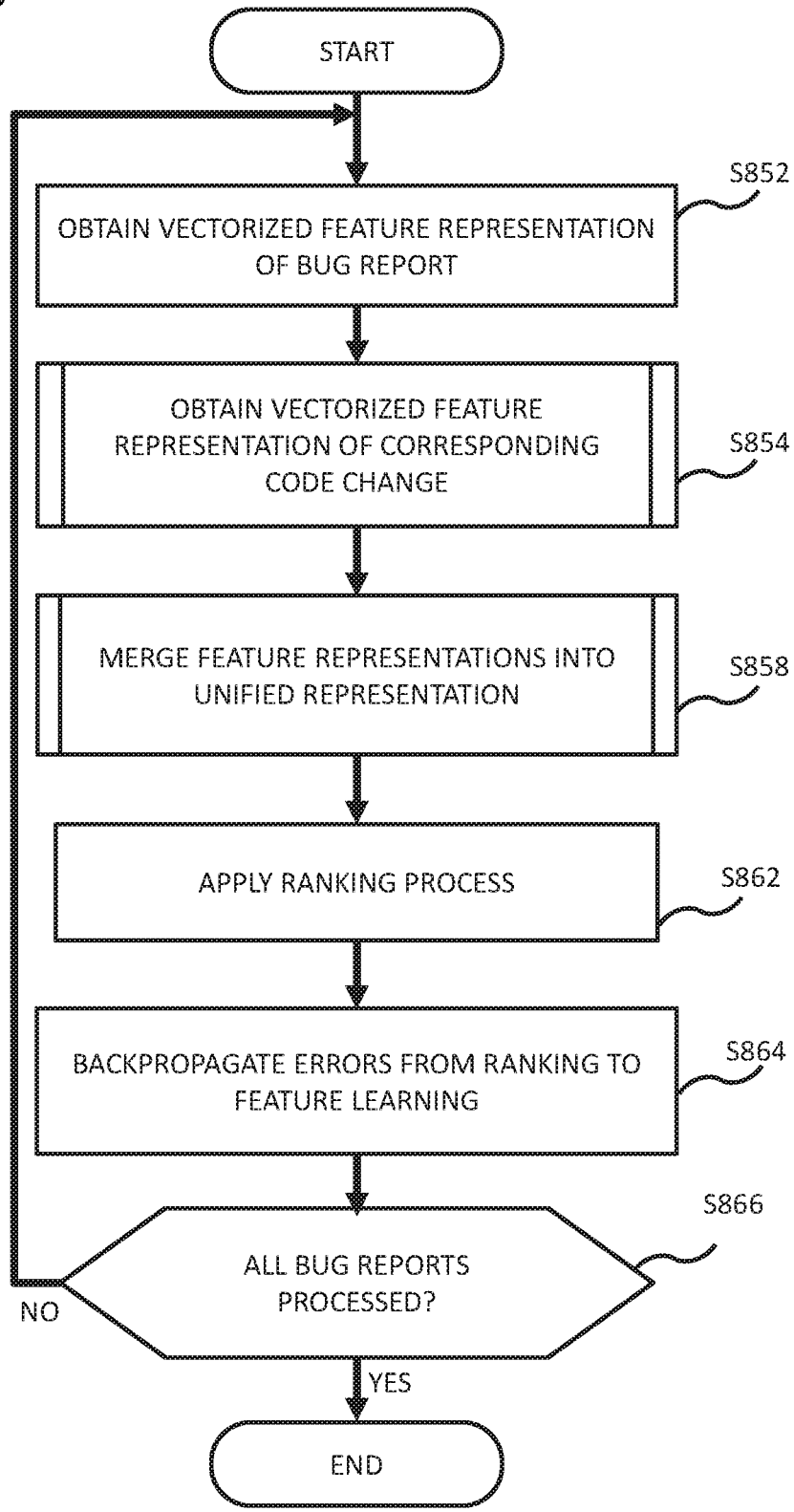
FIG. 8 shows an operational flow for producing a source code relating function, according to an embodiment of the present invention.

FIG. 8 shows an operational flow for producing a source code relating function, such as S650 in FIG. 6, according to an embodiment of the present invention. The operations within this operational flow may be performed by a source code relating function producing section, such as source code relating function producing section 594, or a correspondingly named sub-section thereof.

In order to produce a source code relating function, report-change pairs are processed, such as the report-change pair include bug report 402B and code change 412B.

At S852, a bug report feature representation obtaining section, such as source code relating function producing section 594 or a sub-section thereof, obtains a vectorized feature representation of a bug report. As the operational flow for producing a source code relating function proceeds through the iterations, the bug report feature representation obtaining section obtains a vectorized feature representation of each bug report. The bug report feature representation obtaining section may obtain the vectorized feature representations by applying feature learning process 406 to each bug report.

At S854, a code change feature representation obtaining section, such as source code relating function producing section 594 or a sub-section thereof, obtains a vectorized feature representation of a code change that corresponds to a bug report in a report-change pair. As the operational flow for producing a source code relating function proceeds through the iterations, the code change feature representation obtaining section obtains a vectorized feature representation of each code change that corresponds to a bug report in a report-change pair. The code change feature representation obtaining section may obtain the vectorized feature representations by applying feature learning process 418 to each corresponding code change. In some embodiments, the code change feature representation obtaining section may also obtain further vectorized feature representations by applying feature learning process 416 to each corresponding code change.

At S858, a feature representation merging section, such as source code relating function producing section 594 or a sub-section thereof, merges the feature representation of the bug report and the feature representation of the corresponding source code change into a unified feature representation. As the operational flow for producing a source code relating function proceeds through the iterations, the feature representation merging section merges the feature representations of the bug reports and the feature representations of the source code changes into a plurality of unified feature representations. Each unified feature representation includes one of the feature representations of the bug reports and one of the feature representations of the source code changes. For example, unified feature representation 424B includes feature representation 407B and corresponding feature representation 422B, which correspond to the report-change pair including bug report 402B and code change 412B.

At S862, a ranking process applying section, such as source code relating function producing section 594 or a sub-section thereof, applies a ranking process to the unified feature representation. As the operational flow for producing a source code relating function proceeds through the iterations, the ranking process applying section applies a ranking process to the unified feature representations to produce a source code relating function for relating a bug report and a source code change. The ranking process applying section may apply ranking process 420 to the unified feature representations in order to produce the source code relating function. For example, the source code relating function may be a trained version of ranking process 420. In this embodiment, the ranking process includes a gradient-based learn to rank process. Therefore, training the ranking process includes backpropagating errors from failing to relate a bug report and a code change from the same report-change pair to adjust the parameters of the ranking process.

At S864, a backpropagating section, such as source code relating function producing section 594 or a sub-section thereof, backpropagates errors from the ranking process to the learning process. The backpropagating section may backpropagate errors from failing to relate a bug report and a code change from the same report-change pair to adjust the parameters of one or more of feature learning process 406, feature learning process 416, and feature learning process 418.

At S866, a source code relating function producing section, such as source code relating function producing section 594, determines whether all of the bug reports have been processed by the source code relating function producing section. If any bug reports remain unprocessed, then the operational flow returns to S852, where another report-change pair begins processing. If no bug reports remain unprocessed, then the operational flow for producing a source code relating function is complete. At this point, production of a source code relating function for relating a bug report and a source code change is complete. For example, ranking process 420 has undergone all of the training once all of the bug reports have been processed, and is now considered to be a source code relating function.

In the foregoing embodiment of the operational flow for producing a source code relating function, backpropagation occurs after the processing of every bug report. However, in other embodiments, the backpropagating may not occur after the processing of every bug report, but may occur once per epoch. An epoch may be a static occurrence of a fixed number of bug report processings, or may be dynamic.

Figure 9:
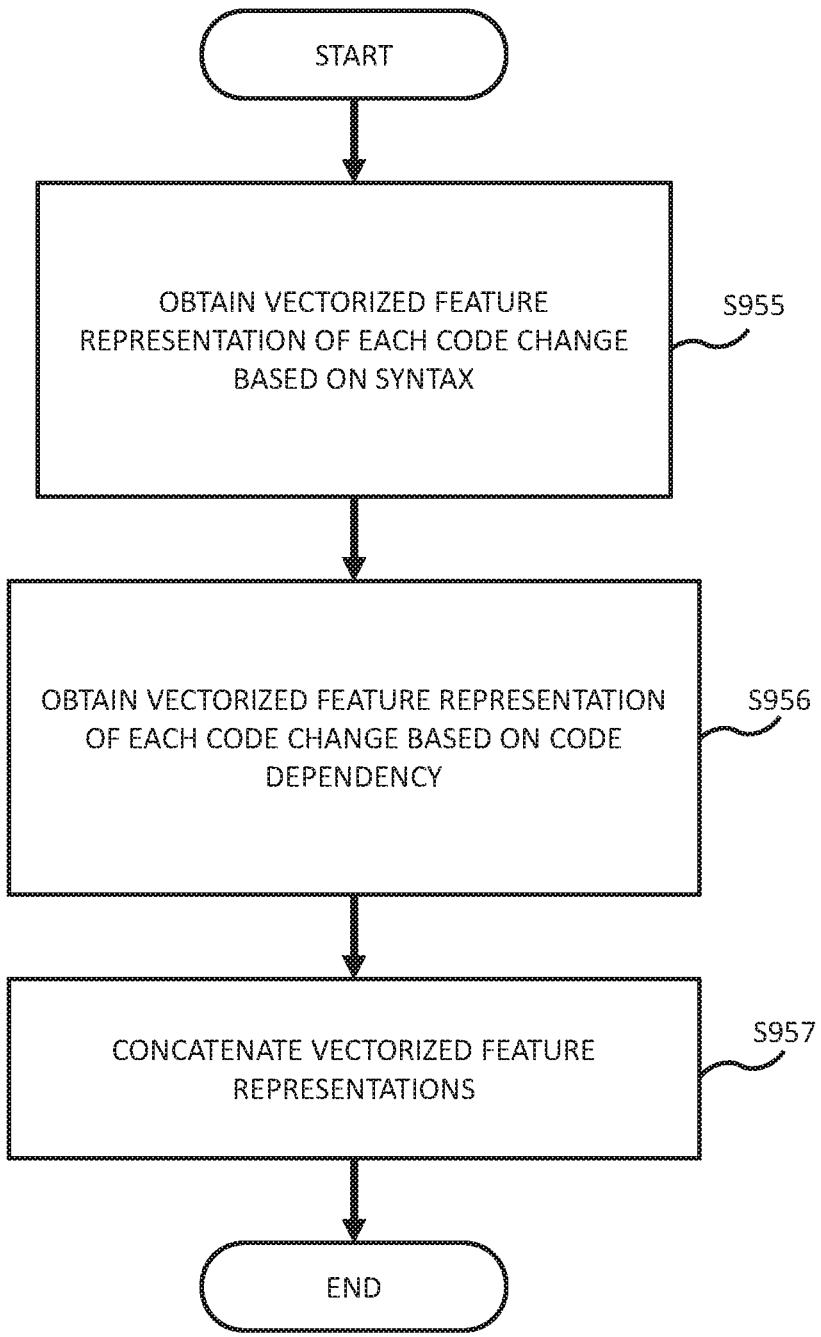
FIG. 9 shows an operational flow obtaining a vectorized feature representation of a code change, according to an embodiment of the present invention.

FIG. 9 shows an operational flow for obtaining a vectorized feature representation of a code change, such as S854 in FIG. 8, according to an embodiment of the present invention. The operations within this operational flow may be performed by a code change feature representation obtaining section, a source code relating function producing section, such as source code relating function producing section 594, or a correspondingly named sub-section thereof.

At S955, a code change syntax-based feature representation obtaining section, such as source code relating function producing section 594 or a sub-section thereof, obtains a vectorized feature representation of the source code change based on syntax. As the operational flow for producing a source code relating function of FIG. 8 proceeds through the iterations, the code change syntax-based feature representation obtaining section obtains a vectorized feature representation of each source code change based on syntax. The code change syntax-based feature representation obtaining section may obtain the vectorized feature representations by applying feature learning process 416 to each corresponding code change.

At S956, a code change dependency-based feature representation obtaining section, such as source code relating function producing section 594 or a sub-section thereof, obtains a vectorized feature representation of the source code change based on the code dependency. As the operational flow for producing a source code relating function of FIG. 8 proceeds through the iterations, the code change syntax-based feature representation obtaining section obtains a vectorized feature representation of each source code change based on the code dependency. The code change dependency-based feature representation obtaining section may obtain the vectorized feature representations by applying feature learning process 418 to each corresponding code change.

At S957, a code change feature representation concatenating section, such as source code relating function producing section 594 or a sub-section thereof, concatenates the feature representation of the source code change based on syntax and the feature representation of the source code change based on the code dependency. As the operational flow for producing a source code relating function proceeds through the iterations, the feature representation concatenating section merges the feature representations of the source code changes based on syntax with the feature representations of the source code changes based on the code dependency. For example, feature representation 422B includes feature representation 416B and corresponding feature representation 418B, each of which correspond to code change 412B.

In the foregoing embodiment of the operational flow for obtaining a vectorized feature representation of a code change, each code change feature representation includes a feature representation of the source code change based on syntax and a feature representation of the source code change based on the code dependency. The result of this is that each unified feature representation includes one of the feature representations of the source code changes based on syntax. In other embodiments, each code change feature representation is based only on code dependency. In such embodiments, feature representations of the source code changes based on syntax need not be obtained, and the feature representations of the source code changes based on the code dependency need not be concatenated. Also in the foregoing embodiment, once the feature representation of the source code change based on syntax and the feature representation of the source code change based on the code dependency are obtained, they are merely concatenated. In other embodiments, merging the feature representations of the source code changes based on syntax with the feature representations of the source code changes based on the code dependency may include more complex processes, such as removing repeated elements, adding other information, etc.

Figure 10:
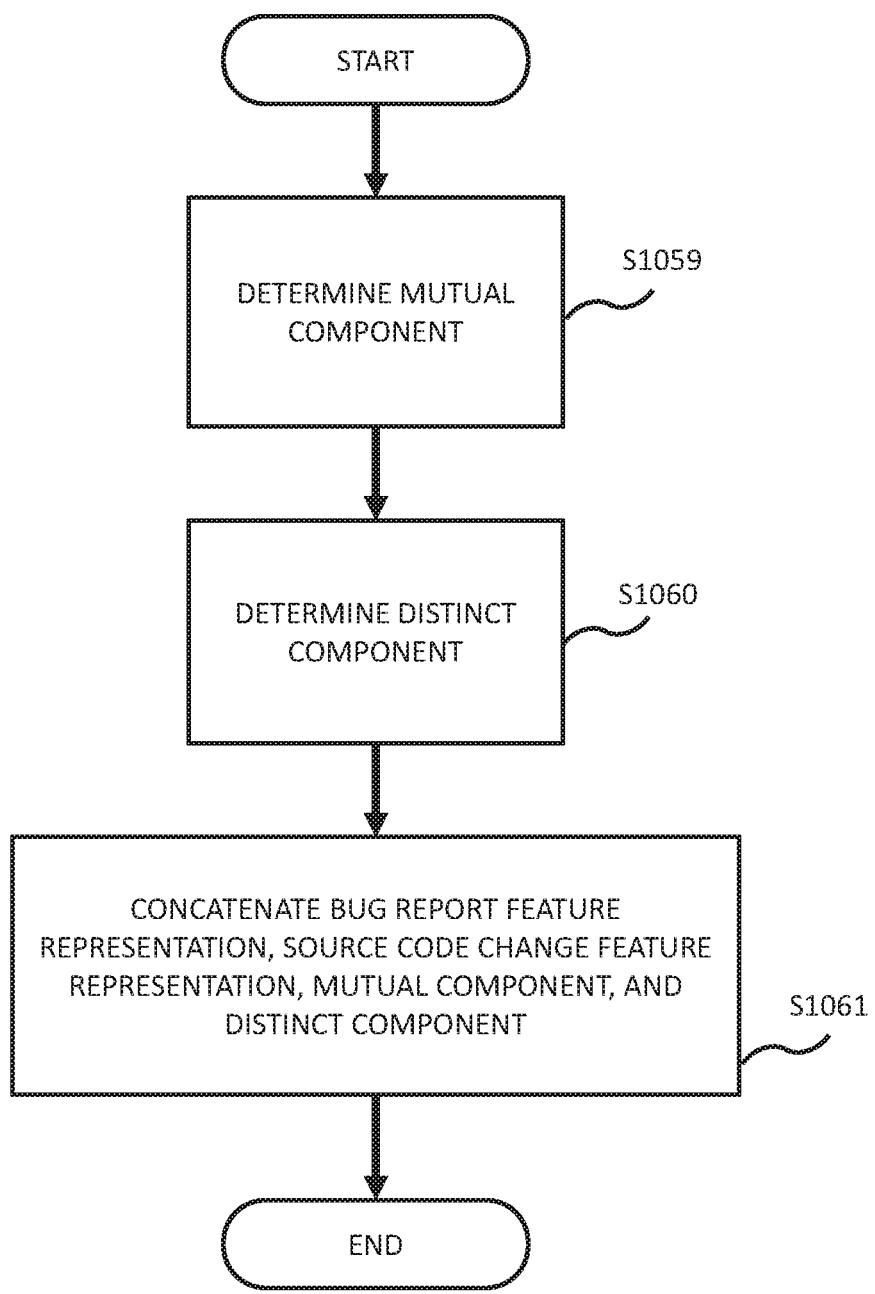
FIG. 10 shows an operational flow for merging feature representations into a unified representation, according to an embodiment of the present invention.

FIG. 10 shows an operational flow for merging feature representations into a unified representation, such as S858 in FIG. 8, according to an embodiment of the present invention. The operations within this operational flow may be performed by a feature representation merging section, a source code relating function producing section, such as source code relating function producing section 594, or a correspondingly named sub-section thereof.

At S1059, a mutual component determining section, such as source code relating function producing section 594 or a sub-section thereof, determines a mutual component between the feature representation of the bug report and the feature representation of the source code change.

At S1060, a distinct component determining section, such as source code relating function producing section 594 or a sub-section thereof, determines a distinct component between the feature representation of the bug report and the feature representation of the source code change.

At S1061, a unified feature representation concatenation section, such as source code relating function producing section 594 or a sub-section thereof, concatenates the bug report feature representation, the source code change feature representation, the mutual component, and the distinct component to form the unified feature representation. Therefore, the corresponding unified feature representation further includes the mutual component and the distinct component.

In the foregoing embodiment of the operational flow for merging feature representations into a unified representation, once the feature representation of the bug report and the feature representation of the source code change are obtained, they are not merely concatenated. In other embodiments, merging feature representations into a unified representation may include more concatenation, or more complex processes, such as adding other information, etc.

Figure 11:
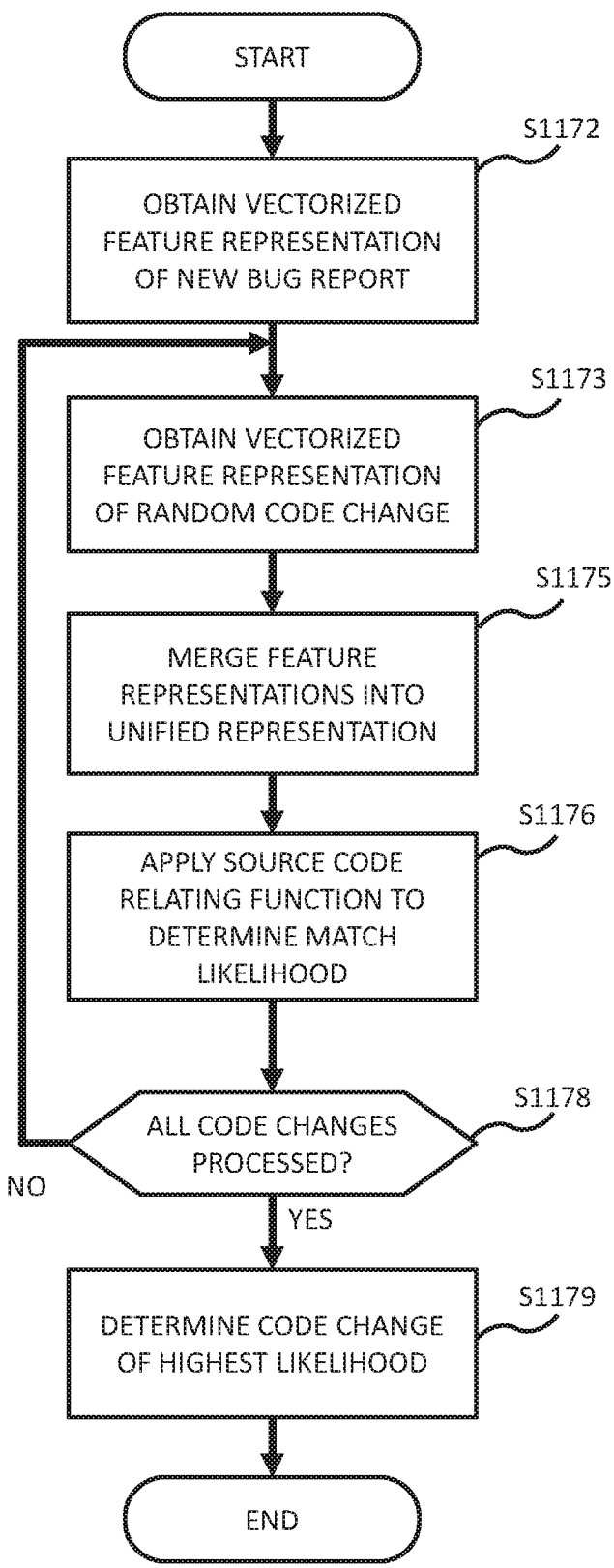
FIG. 11 shows an operational flow for localizing a new bug report, according to an embodiment of the present invention.

FIG. 11 shows an operational flow for localizing a new bug report, such as S670 in FIG. 6, according to an embodiment of the present invention. The operations within this operational flow may be performed by a new bug report localizing section, such as new bug report localizing section 596, or a correspondingly named sub-section thereof.

At S1172, a bug report feature representation obtaining section, such as new bug report localizing section 596 or a sub-section thereof, obtains a vectorized feature representation of a new bug report.

At S1173, a code change feature representation obtaining section, such as new bug report localizing section 596 or a sub-section thereof, obtains a vectorized feature representation of a random code change. A random code change is obtained because it is not yet known which source code change may relate the best to the new bug report. As the operational flow for localizing a new bug report proceeds through the iterations, unprocessed code changes are processed until all of the code changes have been processed. The code change feature representation obtaining section may perform an operational flow similar to the operational flow for obtaining a vectorized feature representation of a code change of FIG. 9.

At S1175, a feature representation merging section, such as new bug report localizing section 596 or a sub-section thereof, merges the feature representation of the new bug report and the feature representation of the random code change into a unified feature representation. The feature representation merging section may perform an operational flow similar to the operational flow for merging feature representations into a unified representation of FIG. 10.

At S1176, a source code relating function applying section, such as new bug report localizing section 596 or a sub-section thereof, applies the source code relating function to the unified feature representation to determine a match likelihood. The unified feature representation may be input to the source code relating function, which then outputs a value representing a likelihood.

At S1178, a new bug report localizing section, such as new bug report localizing section 596, determines whether all of the source code changes have been processed. If any source code changes remain unprocessed, then the operational flow returns to S1173, where a random unprocessed source code change begins processing. If no source code changes remain unprocessed, then the operational flow proceeds to S1179.

At S1179, a code change determining section, such as new bug report localizing section 596 or a sub-section thereof, determines the source code change having the highest likelihood. The code change determining section may determine the highest likelihood output by the source code relating function, and select the source code change associated with the unified feature representation that was input to result in the highest likelihood output. The location(s) in the location component of the selected source code change represent the most likely location where the bug exists in the source code that caused the fault in the new bug report.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the embodiments of the present invention include artificial intelligence, and include neural networks in particular. Some of the foregoing embodiments describe specific types of neural networks. However, a neural network usually starts as a configuration of random values. Such untrained neural networks must be trained before they can be reasonably expected to perform a function with success. Many of the processes described herein are for the purpose of training neural networks for bug localization. Once trained, a neural network can be used for bug localization, and may not require further training. In this way, a trained neural network is a product of the process of training an untrained neural network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more computer readable storage mediums collectively storing program instructions that are executable by a computer to cause the computer to perform operations comprising:
receiving bug reports from a bug tracker and source code changes of a software program, wherein each source code change includes a syntax component and a location component, and wherein each bug report includes a functional description of an aspect of the software program;
obtaining, using a long short term memory (LSTM) neural network, a vectorized feature representation of each bug report, the vectorized feature representation including multi-dimensional word vectors;
applying a learning process to the source code changes based on a code dependency among the source code changes, the applying the learning process including producing a dependency relating function for determining a probability that a source code change is related to one or more other source code changes from a plurality of random walks computed starting from each node of a code dependency graph of source code changes;
obtaining a vectorized feature representation of each source code change based on the code dependency;
merging the feature representations of the bug reports and the feature representations of the source code changes into a plurality of unified feature representations, each unified feature representation including one of the feature representations of the bug reports and one of the feature representations of the source code changes; and
applying a ranking process to the unified feature representations to produce a source code relating function for relating a bug report and a source code change.

2. The computer program product of claim 1, further comprising localizing a new bug report using the source code relating function.

3. The computer program product of claim 1, further comprising:
obtaining a vectorized feature representation of each source code change based on syntax; and
merging the feature representations of the source code changes based on syntax with the feature representations of the source code changes based on the code dependency,
wherein each unified feature representation further includes one of the feature representations of the source code changes based on syntax.

4. The computer program product of claim 1, wherein the applying the learning process comprises:
creating the code dependency graph of source code changes, wherein each source code change is represented by a node, and for each node, an edge is drawn from the node to a nearest previous node representing a source code change including a same location, for each location in the location component included in the node, wherein each random walk from the plurality of random walks is a string of nodes connected by edges over a distance of nodes.

5. The computer program product of claim 1, wherein the applying the learning process comprises applying a weighted learning process.

6. The computer program product of claim 1, wherein the merging the feature representations comprises:
determining a mutual component between the one of the feature representations of the bug reports and the one of the feature representations of the source code changes, determining a distinct component between the one of the feature representations of the bug reports and the one of the feature representations of the source code changes, wherein the corresponding unified feature representation further includes the mutual component and the distinct component.

7. The computer program product of claim 1, wherein the ranking process comprises a gradient-based learn to rank process.

8. The computer program product of claim 1, further comprising backpropagating errors from the ranking process to the learning process.

9. A computer-implemented method comprising:
receiving bug reports from a bug tracker and source code changes of a software program, each source code change including a syntax component and a location component, and each bug report including a functional description of an aspect of the software program;
obtaining, using a long short term memory (LSTM) neural network, a vectorized feature representation of each bug report the vectorized feature representation including multi-dimensional word vectors;
applying a learning process to the source code changes based on a code dependency among the source code changes, the applying the learning process including producing a dependency relating function for determining a probability that a source code change is related to one or more other source code changes from a plurality of random walks computed starting from each node of a code dependency graph of source code changes;
obtaining a vectorized feature representation of each source code change based on the code dependency;
merging the feature representations of the bug reports and the feature representations of the source code changes into a plurality of unified feature representations, each unified feature representation including one of the feature representations of the bug reports and one of the feature representations of the source code changes; and
applying a ranking process to the unified feature representations to produce a source code relating function for relating a bug report and a source code change.

10. The method of claim 9, further comprising localizing a new bug report using the source code relating function.

11. The method of claim 9, further comprising:
obtaining a vectorized feature representation of each source code change based on syntax; and
merging the feature representations of the source code changes based on syntax with the feature representations of the source code changes based on the code dependency,
wherein each unified feature representation further includes one of the feature representations of the source code changes based on syntax.

12. The method of claim 9, wherein the applying the learning process comprises:
creating the code dependency graph of source code changes, wherein each source code change is represented by a node, and for each node, an edge is drawn from the node to a nearest previous node representing a source code change including a same location, for each location in the location component included in the node, wherein each random walk from the plurality of random walks is a string of nodes connected by edges over a distance of nodes.

13. The method of claim 9, wherein the applying the learning process comprises applying a weighted learning process.

14. The method of claim 9, wherein the merging the feature representations comprises:
determining a mutual component between the one of the feature representations of the bug reports and the one of the feature representations of the source code changes;
determining a distinct component between the one of the feature representations of the bug reports and the one of the feature representations of the source code changes;
wherein the corresponding unified feature representation further includes the mutual component and the distinct component.

15. The method of claim 9, wherein the ranking process comprises a gradient-based learn to rank process.

16. The method of claim 9, further comprising backpropagating errors from the ranking process to the learning process.

17. An apparatus comprising:
a receiving section configured to receive bug reports from a bug tracker and source code changes of a software program, each source code change including a syntax component and a location component, and each bug report including a functional description of an aspect of the software program;
a bug report feature representation obtaining section including a long short term memory (LSTM) neural network configured to obtain a vectorized feature representation of each bug report, the vectorized feature representation including multi-dimensional word vectors;
a learning process applying section configured to apply a learning process to the source code changes based on a code dependency among the source code changes, and to produce a dependency relating function for determining a probability that a source code change is related to one or more other source code changes from a plurality of random walks computed starting from each node of a code dependency graph of source code changes;
a dependency-based code change feature representation obtaining section configured to obtain a vectorized feature representation of each source code change based on the code dependency;
a feature representation merging section configured to merge the feature representations of the bug reports and the feature representations of the source code changes into a plurality of unified feature representations, each unified feature representation including one of the feature representations of the bug reports and one of the feature representations of the source code changes; and
a ranking process applying section configured to apply a ranking process to the unified feature representations to produce a source code relating function for relating a bug report and a source code change.

18. The apparatus of claim 17, further comprising a new bug report localizing section configured to localize a new bug report using the source code relating function.

19. The apparatus of claim 17, further comprising:
a syntax-based code change feature representation obtaining section configured to obtain a vectorized feature representation of each source code change based on syntax; and
a code change feature representation merging section configured to merge the feature representations of the source code changes based on syntax with the feature representations of the source code changes based on the code dependency, wherein each unified feature representation further includes one of the feature representations of the source code changes based on syntax.

20. The apparatus of claim 17, wherein the ranking process applying section comprises:
- a code dependency graph creating section configured to create the code dependency graph of source code changes, wherein each source code change is represented by a node, and for each node, an edge is drawn from the node to the nearest previous node representing a source code change including a same location, for each location in the location component included in the node;
- a random walk computing section configured to compute the plurality of random walks starting from each node, each random walk being a string of nodes connected by edges over a distance of nodes; and
- a dependency relating function producing section configured to produce the dependency relating function for determining the probability that the source code change is related to the one or more other source code changes from the plurality of random walks.

* * * * *